United States Patent
Kalintsev et al.

(10) Patent No.: US 8,955,130 B1
(45) Date of Patent: Feb. 10, 2015

(54) METHOD FOR PROTECTING VEHICLE DATA TRANSMISSION SYSTEM FROM INTRUSIONS

(71) Applicant: Zephyr Technology Co., Limited, Hong Kong (HK)

(72) Inventors: Nikolay Kalintsev, Moscow (RU); Dmitry Mikhailov, Moscow (RU); Timur Khabibullin, Ufa (RU); Andrey Starikovsky, Moscow (RU); Alexander Zuykov, Moscow (RU)

(73) Assignee: Zephyr Technology Co., Limited, Hong Kong (HK)

( * ) Notice: Subject to any disclaimer, the term of this patent is extended or adjusted under 35 U.S.C. 154(b) by 0 days.

(21) Appl. No.: 14/249,375

(22) Filed: Apr. 10, 2014

(51) Int. Cl.
*G06F 11/00* (2006.01)
*G06F 21/56* (2013.01)

(52) U.S. Cl.
CPC .................................. *G06F 21/567* (2013.01)
USPC ................ 726/23; 710/100; 701/415; 726/34

(58) Field of Classification Search
CPC .......................... H04L 63/1416; H04L 63/145
USPC ...................................................... 726/22–25
See application file for complete search history.

(56) References Cited

U.S. PATENT DOCUMENTS

| | | | | |
|---|---|---|---|---|
| 5,926,031 A * | 7/1999 | Wallace et al. | ................. | 326/30 |
| 6,141,710 A * | 10/2000 | Miesterfeld | ................... | 710/100 |
| 6,380,748 B1 * | 4/2002 | Kang et al. | .................... | 324/645 |
| 7,555,787 B2 * | 6/2009 | Clercq | ............................ | 726/34 |
| 8,392,753 B1 * | 3/2013 | Don et al. | ...................... | 714/6.3 |
| 2011/0048756 A1 * | 3/2011 | Shi et al. | ......................... | 174/50 |
| 2012/0089299 A1 * | 4/2012 | Breed | ............................. | 701/36 |
| 2013/0031599 A1 * | 1/2013 | Luna et al. | ........................ | 726/1 |
| 2013/0191018 A1 * | 7/2013 | Siereveld et al. | ............. | 701/415 |

* cited by examiner

*Primary Examiner* — Nirav B Patel
*Assistant Examiner* — Mohammed Waliullah
(74) *Attorney, Agent, or Firm* — Bardmesser Law Group (57) ABSTRACT

A system and method for detecting an intrusion or a bug in a vehicle data transmission system. A hardware-software complex (HSC) is used to find a bug or intrusion device in a vehicle electronic system. The HSC is connected to CAN-buses in the vehicle and also scans radio waves, which can be used to transmit data to a bug. This complex is a self-teaching CAN-system used to monitor and block harmful commands in the vehicle. Each vehicle (of each model, type and settings) has its own reference bus data (parameters), which is used to detect added modules and malicious data sent over the vehicle's CAN bus.

19 Claims, 8 Drawing Sheets

METHOD FOR PROTECTING VEHICLE DATA TRANSMISSION SYSTEM FROM INTRUSIONS

BACKGROUND OF THE INVENTION

1. Field of the Invention

The present invention is related to vehicle security and, in particular, to a method and system for protecting a vehicle data transmission bus from intrusions and bugs at a hardware level.

2. Description of the Related Art

Today, vehicle safety has taken a completely new meaning due to the fact that control systems of modern cars are becoming increasingly autonomous. Almost all systems within a vehicle are now controlled by electronics: engine, brakes, cruise control, air bags, climate control, windshield wipers, etc. Many modern cars are equipped with so called "start buttons"—instead of turning the ignition key, a driver can press the button to start the engine. Without complex electronics, it would be impossible to implement all of these features.

Nevertheless, modern car systems have a serious drawback—hardware vulnerability. Before, all risks were caused by external or technological factors, but now the vehicle itself is a source of danger. Among the most obvious threats, modern cars are able to interact with external data carriers via various wired/wireless technologies (USB-port, Bluetooth, Wi-Fi, 3G). Such interactions can endanger the internal vehicle network, making it vulnerable to cyber attacks.

Like any automatic control system, vehicle controller area network (CAN) bus system has its vulnerabilities. Recent studies into this field have revealed a variety of possible attacks on a CAN bus, aimed at intruding and affecting control over a vehicle. According to the study by Dennis K. Nilsson, electronic control modules (ECMs) of a car can be divided into five categories based on their control areas: transmission, vehicle safety, comfort, information/entertainment and telematic systems.

Another classification divides ECMs into four levels according to their possible impact on car control safety. Finally, the researcher ranks safety threats according to the damage they can cause, which is then used to classify attacks. Currently, there are no systems that are able to protect the vehicle data transmission bus from intrusion and tampering at a hardware level.

Accordingly, a method and system for protecting a vehicle data transmission bus from intrusion attacks and bugs is desired.

SUMMARY OF THE INVENTION

The present invention is related to vehicle security and, in particular, to a method and system for protecting a vehicle data transmission bus from intrusions and bugs at hardware level that substantially obviates one or several of the disadvantages of the related art.

In one aspect of the invention, a system and method for detecting an intrusion or a bug in a vehicle data transmission system are provided. A specially designed hardware-software complex (HSC) module is used to find a bug in the vehicle's data transmission system. The HSC is connected to CAN-buses in the vehicle and scans radio waves, which can be used to transmit data to a bug. This complex is a self-teaching CAN-system used to monitor and block harmful commands in the vehicle. Each vehicle (of each model, type and settings) has its own reference bus data (parameters), which is used to detect added modules and a harmful data sent over the vehicle CAN bus. The harmful modules (bugs) can be attached to the CAN bus or to a wire bundle.

According to an exemplary embodiment, there are two main methods of detection and prevention of unauthorized connections to the vehicle CAN bus:
- Monitoring of resistive and capacitive bus state;
- Blocking of commands that send one or several modules into the service mode.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for protecting a vehicle data transmission bus from intrusions and bugs at hardware level are provided.

According to an exemplary embodiment, there are two main methods of detection and prevention of unauthorized connections to the vehicle CAN bus:
- Monitoring of resistive and capacitive bus state;
- Blocking of commands that send one or several modules into a service mode.

The harmful modules (bugs) can be attached to the CAN bus or to a wire bundle (connecting the CAN_H, CAN_L, +12V, GND).

Figure 1:
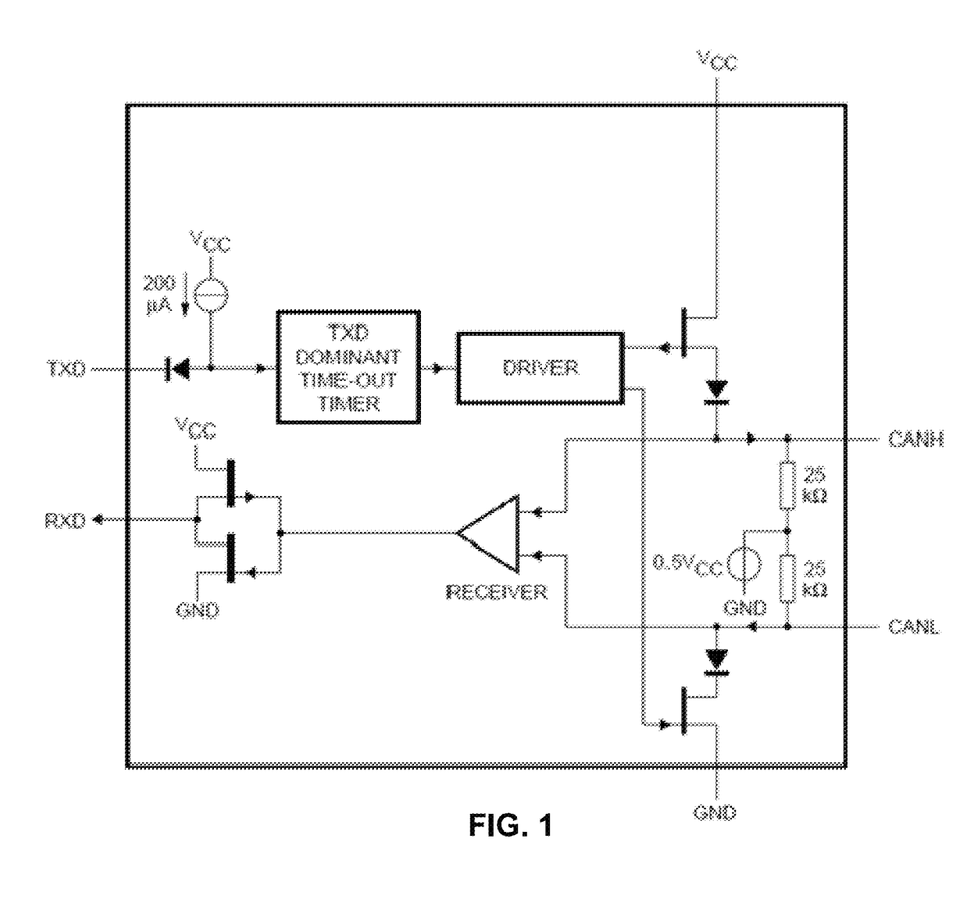
FIG. 1 illustrates a detailed architecture of a transceiver used in the exemplary embodiment.

The monitoring of resistive and capacitive bus state using a transceiver is depicted in FIG. 1. This method relies on the fact that any extra device connected to the bus results in lower resistance and higher capacitance. In order to monitor these parameters, a transceiver is used. A detailed architecture of the transceiver, in accordance with the exemplary embodiment is shown on FIG. 1. The resistors (25 kOhm each) are used for correlation of voltage levels CAN_H CAN_L and for noise resistance. The transistors with diodes are used for reaching a voltage level—in this case to 2.5V (0.5 Vcc). The receiver is used for summing the signals CAN_H and CAN_L. The transistor assembly is used for signal level transformation of the TX Time-out Timer for waiting for transmission permission. The driver separates signals CAN_H and CAN_L (the voltage level on both buses is reached by the transistors).

Figure 2:
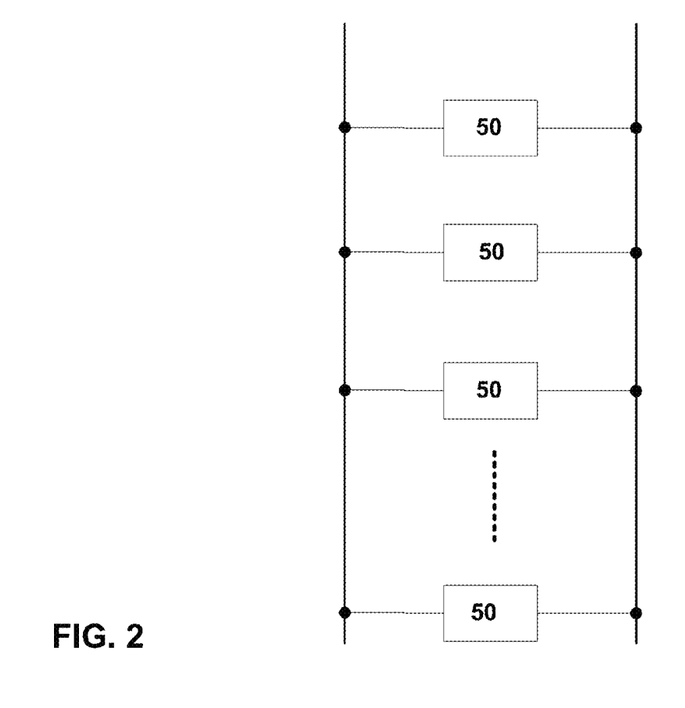
FIG. 2 illustrate a CAN bus with the transceiver attached to it, in accordance with the exemplary embodiment.
Figure 3:
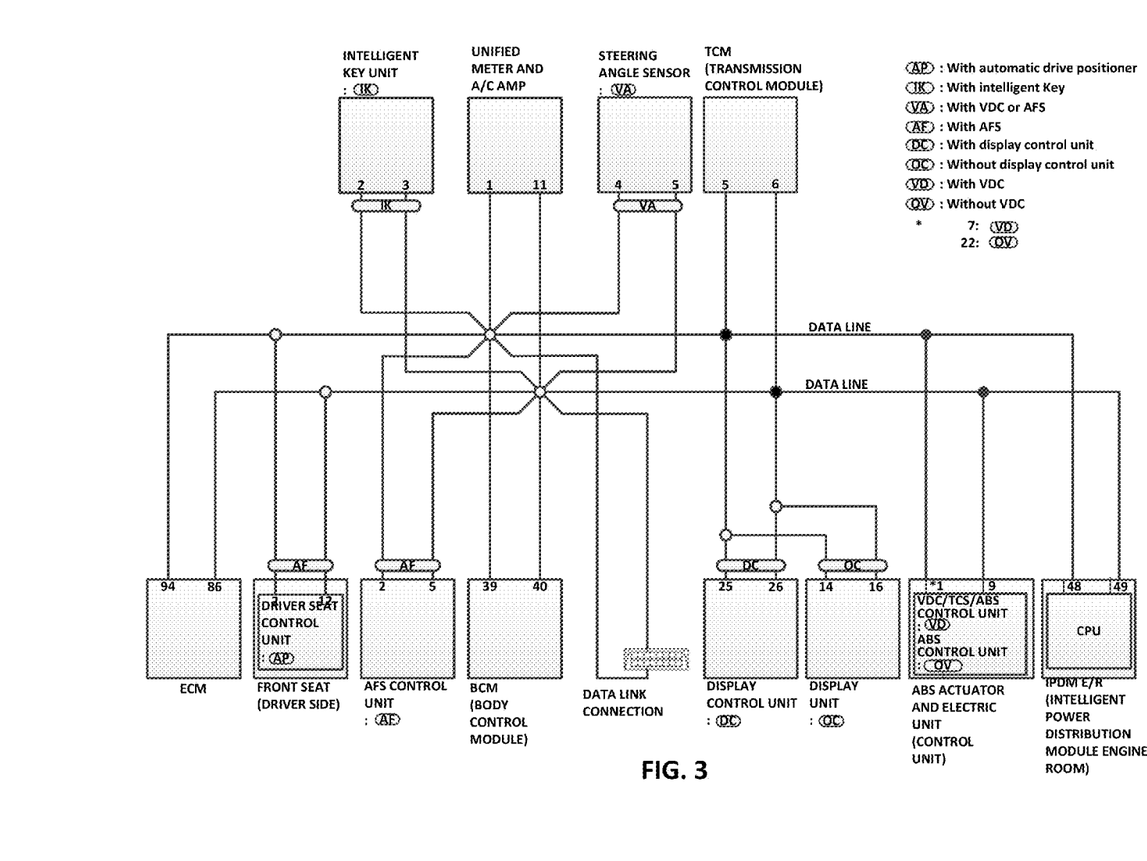
FIG. 3 illustrates an exemplary vehicle electronic system configuration.

The exemplary method was tested on a Nissan Teana J31 manufactured in 2006 in order to estimate its efficiency to detect unauthorized connections. According to $t_{he}$ vehicle's technical documentations, its CAN bus has resistance ($R_{tot}$) of about 4.6 kOhm. Each transceiver connected to the bus has a resistance of R≈50 kOhm as shown in FIG. 2 depicting a CAN bus with the transceiver attached to it. Then, a number of devices connected to the bus can be calculates as:

$R_{tot}$=R/N=>N≈10.8≈11 devices, which corresponds to the exemplary vehicle electronic configurations, as depicted in FIG. 3.

Figure 4:
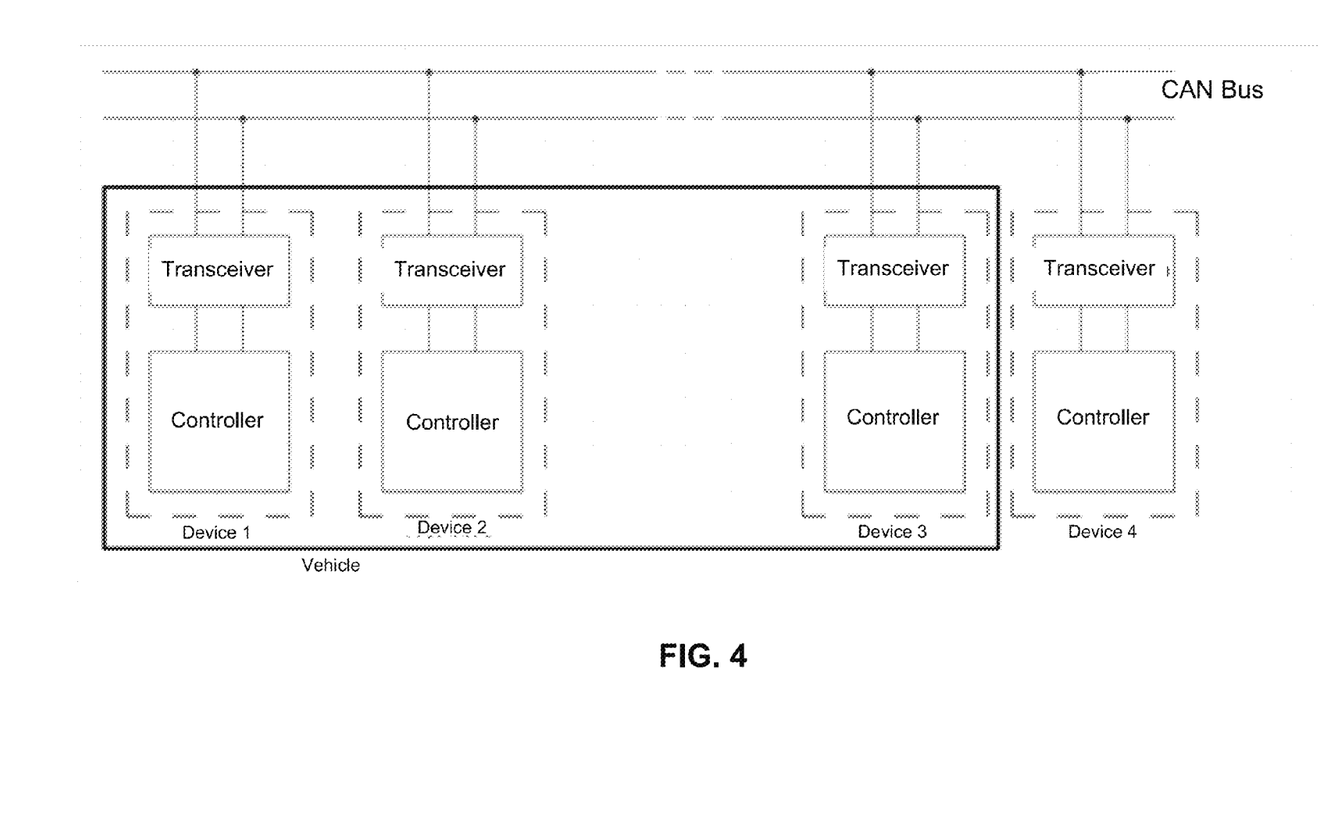
FIG. 4 illustrates connection of an additional device to the CAN bus.

Then, a bug ($R_1$≈50 kOhm) is connected to the CAN bus. The total CAN bus resistance is $R_{tot1}$=4.3 kOhm. Connection of an additional device 4 to the CAN bus is shown in FIG. 4. Using the formula $R_{tot1}$=$R_1$/$N_1$ a number of devices connected to the bus can be calculated: $N_1$≈11.7≈12. Thus, this indicates that there is an extra device on the bus.

According to the exemplary embodiment, the capacitive bus state is monitored in the same way. A transceiver has internal CAN capacity of about 10 picofarads (pF), which allows it to detect an unauthorized device based on increased total capacitance (the capacitance increases, if an extra device is connected).

Figure 5:
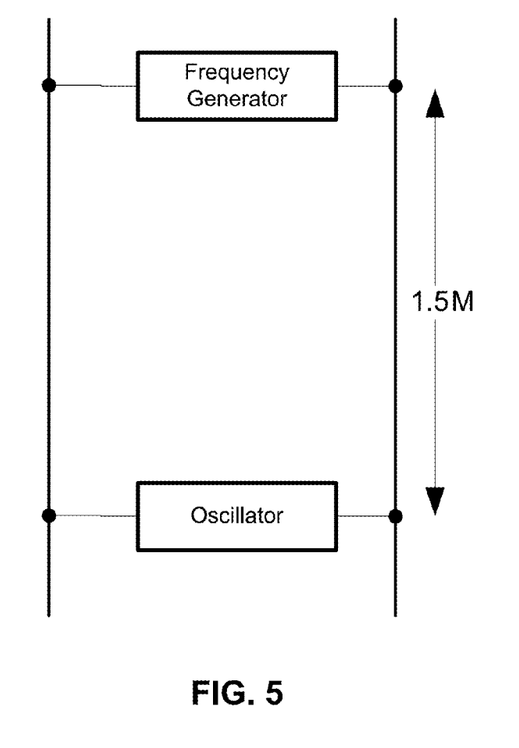
FIG. 5 illustrates an arrangement for standing wave impedance measurement method.

The method described above can be used to monitor a working CAN bus. According to the exemplary embodiment, if it is necessary to conduct and extra check of a switched-off bus, the standing wave measurement method can be used to detect hardware bugs (see FIG. 5). A frequency generator and an oscillator are placed on the CAN bus 1-1.5 m away from each other and connected to the HSC. Then, the standing wave on the CAN bus is measured. As described above, standing wave frequency data is compared against reference values (which may be a pre-set value, or a previously measured value, for example, shortly after purchase of the car), which allows to detect hardware bugs.

According to another exemplary embodiment, blocking of the commands that input one or several modules into the service mode is implemented. To block the commands inputting one or several modules into the service mode, the CAN bus state is forced to change from dominant to recessive, thus preventing the sequence from being completed (see FIG. 6).

Figure 6:
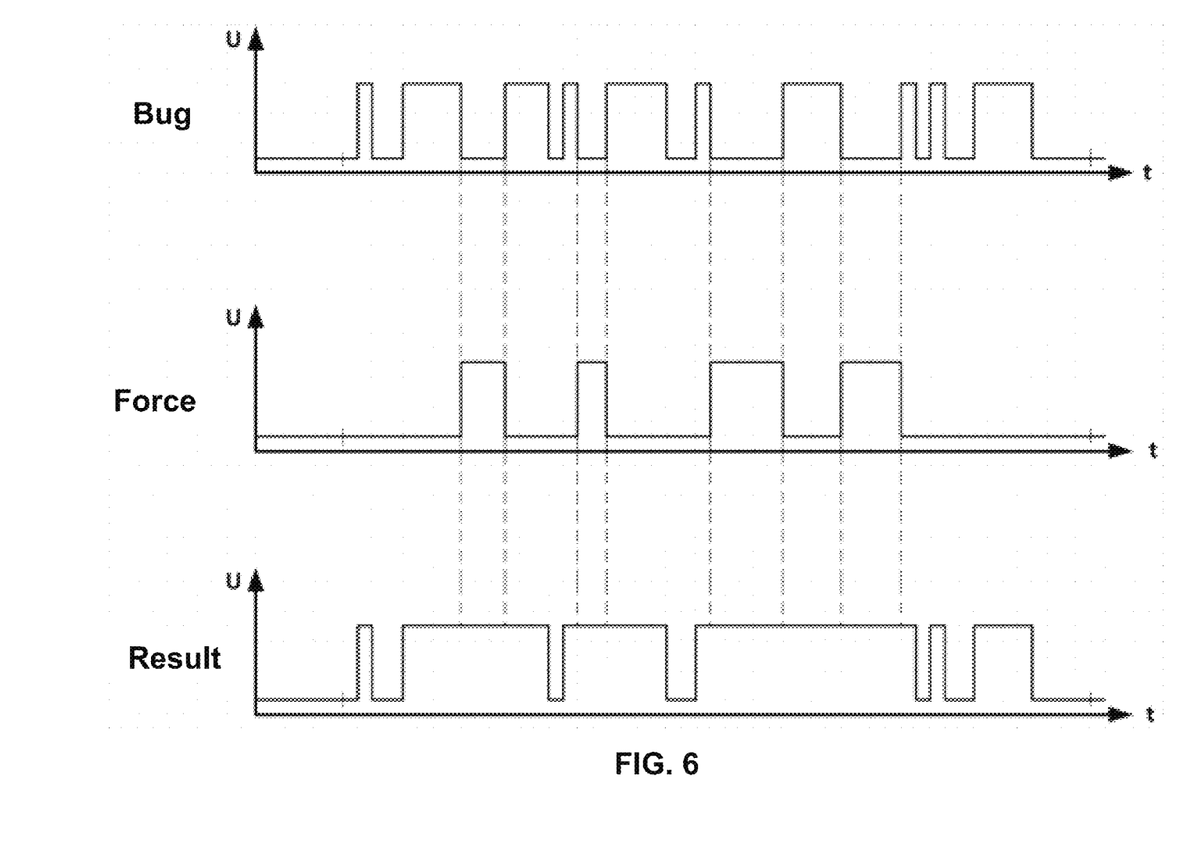
FIG. 6 illustrates deactivation of a malicious command sequence.

As shown in FIG. 6, when the system forces the logical level on the CAN bus to a higher value, a completely different resulting command is produced. This protects the vehicle and does not allow for inputting modules into the service mode. In other words, by forcing a change of the state of the CAN bus from active to passive, the command is modified and does not work as intended by a malicious intruder.

Figure 7:
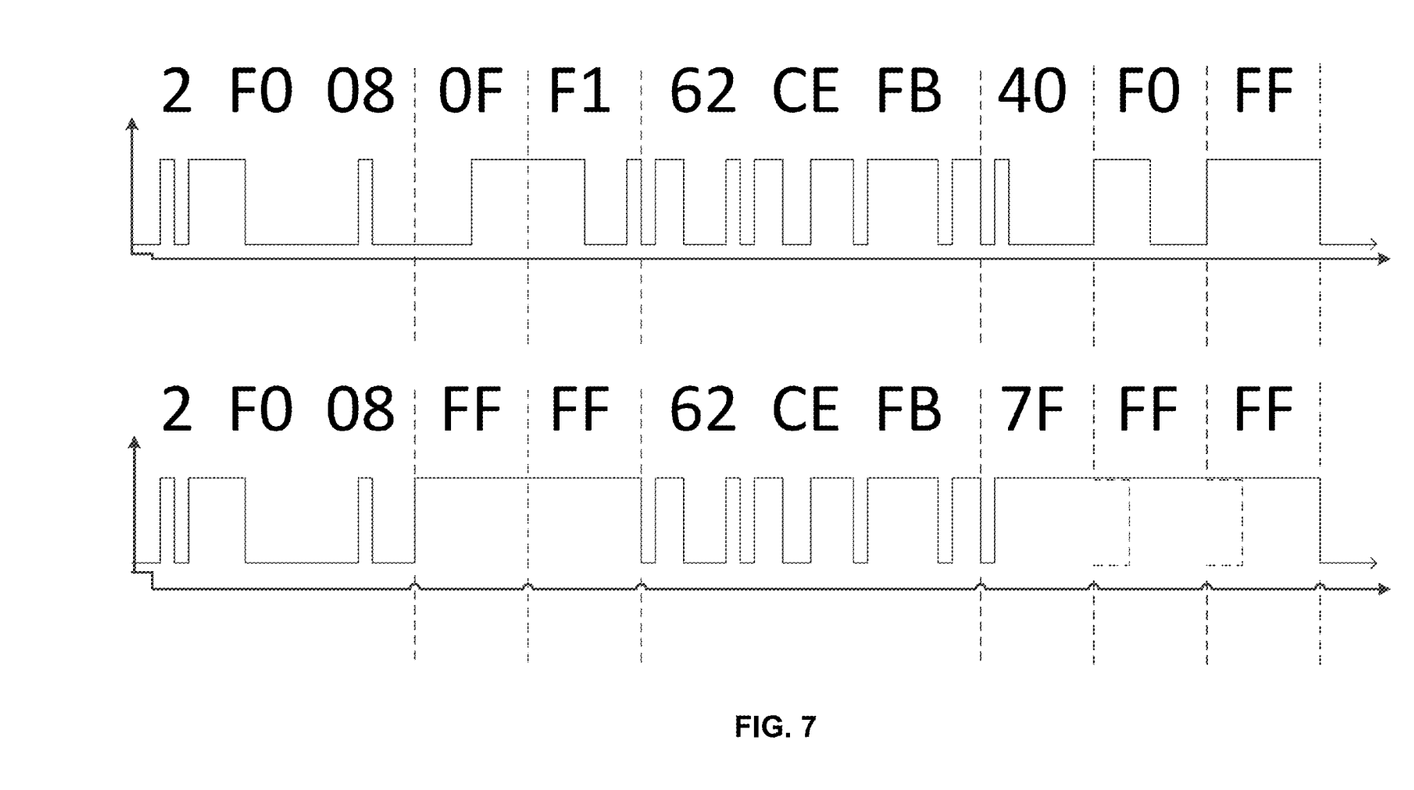
FIG. 7 illustrates an example of modification of the third input command into service mode.

FIG. 7 illustrates an example of modification of the third input command into service mode of the ABS/ESP block of a Ford Mondeo MK4. The entire instruction for inputting a module into the service mode is:

02 00 08 35 FF 00 48 04 1A FC 43; 04 00 08 FF FA 0A 86 BC 31 FF F0; 02 F0 08 0F F1 62 CE FB 40 F0 FF. The resulting (modified) sequence module 02 00 08 35 FF 00 48 04 1A FC 43; 04 00 08 FF FA 0A 86 BC 31 FF F0; 02 F0 08 FF FF 62 CE FB 7F FF FF does not enter into the service mode. The sequence results in turning off the ESP, which is not critical and can be resolved by pressing a button on the driver's console.

A detailed description of the proposed defense mechanism is as follows: first, a harmful sequence is detected, which consists of at least three commands. A typical harmful sequence has at least three commands. If two such commands are detected, the third one is deactivated. Note that the third command is blocked, because the first command is used in a normal service mode, but after two suspicious commands in a row the system knows that the third one needs to be blocked as malicious. As soon as the command identifier is detected on the bus, the system begins blocking the command. Then, module states are checked. If there are modules working in a service mode, they are exited from this mode. After that, the system prepares a report about the attack.

Resistive and capacitive bus characteristics are checked and compared with a standard state of the particular car. If any characteristics are off, the system reports the attack. The bus protection module reports the attack by (for example) making beeping sounds. Additionally, the bus protection module can have an LED indicator displaying a green light under normal operations. If intrusion is detected, the bus protection module displays blinking red light and beeps. When the attack is blocked, the yellow light is displayed on the LED and the blinking red light indicating a presence of a bug. The bus protection module can store the details of the intrusion and provide them to a user if the user connects to a computer.

Then, a check is conducted to detect any external radio waves. If such waves are detected, their source is analyzed in order to exclude sources not used for attacking (e.g., mobile networks, Wi-Fi etc.). If the detected radio waves come from a harmful source, the system reports the attack. An algorithm of a vehicle protection method is shown on FIG. 8.

Figure 8:
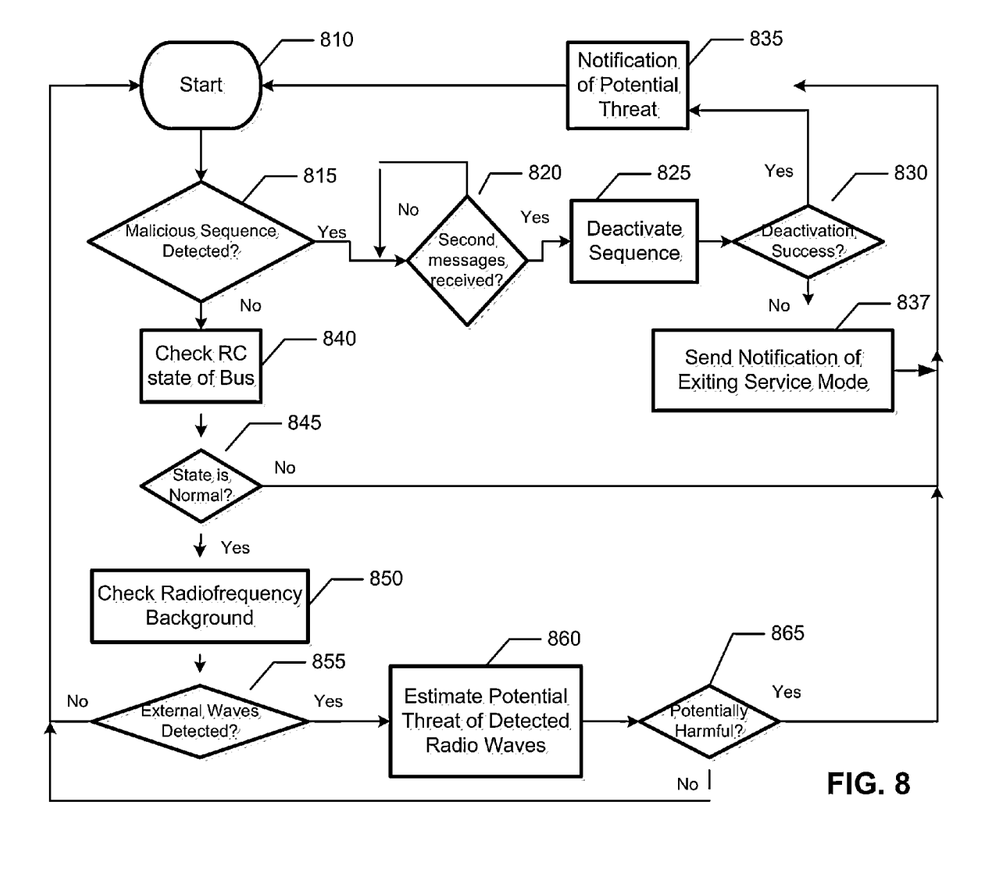
FIG. 8 illustrates a flow chart of a method, in accordance with the exemplary embodiment.

In step 810, the process is started. If a malicious sequence is detected in step 815, the system checks if a second message is received in step 820. Then, the sequence is deactivated in step 825. If the deactivation is successful in step 830, notification of a potential threat is sent in step 835. Otherwise, a notification of exiting a service mode is sent in step 837. If, in step 815, the malicious sequence is not detected, the process check an RC state of a CAN bus in step 845. If the state is normal in step 845, the process checks a radiofrequency background in step 850. Otherwise, the process moves to step 835.

If, in step 855, external waves are detected, the process estimates a potential threat of the detected radio waves in step 860. If, in step 865, the threat is deemed potentially harmful, the process moves to step 835. Otherwise, the process moves back to the start (step 810). According to the exemplary embodiment, the bus protection module has a virtual cell also used for prevention of eavesdropping on conversations inside the car. The virtual cell analyzes the devices attached or connected to the bus. If such a device is a mobile phone, the signals incoming into the phone are not recognized as threats. However, if a device is just a GSM module (also detected by the virtual cell), the incoming into the device signals are analyzed for commands activating a vehicle device. If these commands are detected, the wave signals are deemed as threats. The radio waves from WiFi and BlueTooth transmitters can be detected.

According to the exemplary embodiment, the vehicle bus protection module can also analyze data on multi-media bus (MM_CAN) for transmissions of audio data. In a regular mode the MM_CAN bus transmits commands and small data blocks (e.g., a song name and an artist). As soon as large volumes of data are sent, the system understands that eavesdropping of the inside the car is occurring. Additionally, a virtual cell node is used for analysis of connected devices and data transmitted over a mobile network and WiFi/BlueTooth. The virtual cell node blocks data transmissions from a suspected device or WiFi/BlueTooth outlet. The vehicle bus protection module modifies the checksums of transmitted data (similar to modification of a third command discussed above). Thus, the data becomes unreadable. Thus, the vehicle bus protection module can monitor data on the multi-media bus and detects bugs or intrusions into the car's entertainment system.

According to one exemplary embodiment, the vehicle bus protection module is attached to the vehicle CAN buses. Additionally, an anti-virus (AV) application can be installed on the vehicle computer. The AV application monitors the data on the CAN buses. This prevents an intruder from installing malware modules. For example, an intruder might install a malware component, which controls the air bags in such a way that this module sends a command for turning off the breaks and activating the air bags at the speed of 85 miles per hour. The AV detects the malicious commands and informs the vehicle bus protection module for immediate blocking of the malicious command(s).

Note that the AV module can be connected to the vehicle bus protection module via a data bus or several buses, which makes the interaction very efficient. According to one exemplary embodiment, the system displays an AV notification of detected malicious threat on a driver panel.

Also, a method for analyzing packets identifiers that are transmitted on CAN bus may be used. Currently, the application-level protocol, implemented in car's electronics differs significantly from one car model to another even if two cars have the same manufacturer. It becomes a problem to perform a complete analysis of the transmitted packets, since the implementation of protocol parser will be different for different car models. To provide a certain level of protection without losing a common approach, it is proposed to use the following algorithms to detect misbehavior or malware modules. The car is started, but no actions (like pedal pressing or steering wheel rotation) are performed. For all packet identifiers (that are required part of CAN interface packets), the following calculations are performed: frequency of appearance normalized to a collection period (for example, if we have a collection of 5000 packets captured on the bus and the specific identifier appeared 17 times, we have a normalized value of 17/5000), dispersion of frequency of appearance (for example, we have an identifier appeared 43 times; then, we prepare an array, containing the number of other identifiers appeared between each pair of sequential appearances of the identifier of interest; we consider these values to be a variance in terms of statistics and can calculate dispersion of this variance). After that, the obtained values are compared to reference ones for each identifier. The reference values can be obtained when the car was just purchased. If obtained values differ from the reference ones, the user receives a warning of interface misbehavior. Also, all new identifiers, that didn't appear in the reference measurements, are reported as warning.

Having thus described a preferred embodiment, it should be apparent to those skilled in the art that certain advantages of the described method and apparatus have been achieved. In particular, those skilled in the art will appreciate that the proposed system and method provide for efficient protection of a vehicle CAN bus against intrusions and bugs.

It should also be appreciated that various modifications, adaptations and alternative embodiments thereof may be made within the scope and spirit of the present invention. The invention is further defined by the following claims.

What is claimed is:

1. A system for protecting a vehicle data bus from intrusions and bugs, the system comprising:
    a vehicle data bus based on a CAN (Controller Area Network) standard;
    a vehicle bus protection module attached to the vehicle data bus and configured to monitor a state of the vehicle data bus indicative of a malicious data sequence on the vehicle data bus;
    a transceiver implemented as part of the vehicle bus protection module,
    wherein if there is no malicious data sequence detected:
        the transceiver is configured to monitor a resistive or a capacitive vehicle bus state and to detect a lower resistance or a higher capacitance of the vehicle data bus that indicates a presence of intrusion in the vehicle data bus; and
    the vehicle data bus protection module is configured to detect an additional device attached to the vehicle data bus by estimating a total number of the devices based on a measured resistance of the vehicle data bus and to send a notification about the additional device to a driver display panel if the measured resistance is abnormal.

2. The system of claim 1, further comprising a generator and an oscillator coupled to the vehicle data bus protection module for measuring a standing wave on the vehicle data bus in a switched off sate, wherein the vehicle data bus protection module is configured to compare a standing wave frequency value against a reference value for the vehicle data bus.

3. The system of claim 2, wherein the data bus protection module is configured to generate an intrusion notification.

4. The system of claim 2, wherein the reference value is an earlier measured value.

5. The system of claim 2, wherein the reference value is a pre-set value.

6. The system of claim 1, wherein the vehicle data bus protection module is configured to block a command inputting at least one module into a vehicle service mode.

7. The system of claim 6, wherein the command is blocked by forcing a change in a state of the vehicle data bus from active to passive.

8. A method for detecting an intrusion or a presence of a bug on a vehicle data bus, the method comprising:
    detecting a malicious data sequence on the vehicle data bus;
    displaying a notification of a potential threat;
    checking a resistive or a capacitive state of the vehicle data bus, if no malicious data sequence is detected;
    displaying the notification of the potential threat, if the resistive or the capacitive state of the vehicle data bus is not normal;
    detecting external radio waves;
    estimating a potential threat based on the detected radio waves; and
    displaying the threat notification to the driver if the detected radio waves are deemed malicious.

9. The method of claim 8, wherein the threat notification is a blinking light and a beeping sound.

10. The method of claim 8, further comprising monitoring a multi-media bus and detecting intrusions into a vehicle audio system.

11. The method of claim 8, further comprising monitoring the vehicle data bus by an AV module and detecting threats.

12. The method of claim 8, further comprising checking a radio frequency background of the vehicle data bus.

13. The method of claim 8, further comprising deactivating the data sequence by applying a recessive data sequence.

14. The method of claim 8, further comprising displaying a notification of the detected threat on a driver panel.

15. The method of claim 8, wherein the vehicle data bus is a CAN (Controller Area Network) bus, and further comprising:
   collecting reference values of packet identifiers that appeared on the CAN bus, their frequencies of appearance, dispersion of their frequencies of appearance on a started car with no actions performed with car controls;
   detecting new packet identifiers appearing on the CAN bus with respect to the collected reference values;
   calculating a frequency of appearance change for each packet identifier with respect to reference values;
   calculating a frequency of appearance dispersion change for each packet identifier with respect to reference values; and
   warning the driver if there were new identifiers or frequency changes were above a warning threshold or if the frequency dispersion changes were above the warning threshold.

16. The method of claim 8, further comprising collecting reference values of packet identifiers that appeared on the vehicle data bus, their frequencies of appearance, and dispersion of their frequencies of appearance on a started car with no actions performed with car controls.

17. The method of claim 8, further comprising detecting new packet identifiers appearing on the vehicle data bus with respect to previously collected reference values, and calculating a frequency of appearance change for each packet identifier with respect to the reference values.

18. The method of claim 8, further comprising calculating a frequency of dispersion change for each packet identifier on the vehicle data bus with respect to reference values, and
   warning the driver if there were new identifiers or frequency changes were above a warning threshold or if the frequency dispersion changes were above the warning threshold.

19. A system for protecting a vehicle data bus from intrusions and bugs, the system comprising:
   a vehicle data bus based on a CAN (Controller Area Network) standard;
   a vehicle bus protection module attached to the vehicle data bus and configured to monitor a state of the vehicle data bus indicative of a malicious intrusion into the vehicle data bus;
   a transceiver implemented as part of the vehicle bus protection module,
   wherein:
      the transceiver is configured to monitor a resistive vehicle bus state and to detect a lower resistance of the vehicle data bus that indicates a presence of intrusion in the vehicle data bus;
      the vehicle data bus protection module is configured to detect an additional device attached to the vehicle data bus by estimating a total number of the devices based on a measured resistance of the vehicle data bus, and
   the vehicle data bus protection module is configured to send a notification about the additional device as indicative of the malicious intrusion to a driver display panel.

* * * * *